US012762071B2

(12) United States Patent
Centazzo

(10) Patent No.: US 12,762,071 B2
(45) Date of Patent: Oct. 13, 2026

(54) RUNTIME MEMORY SYSTEM WITH UNPREDICTABLY ASSIGNED MULTIPLEXED MEMORY BUS LINES

(71) Applicant: Google LLC, Mountain View, CA (US)

(72) Inventor: Alessio Centazzo, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 19/070,782

(22) Filed: Mar. 5, 2025

(65) Prior Publication Data

US 2025/0199967 A1 Jun. 19, 2025

Related U.S. Application Data

(60) Provisional application No. 63/765,370, filed on Feb. 28, 2025.

(51) Int. Cl.
*G06F 13/16* (2006.01)

(52) U.S. Cl.
CPC .......... *G06F 13/16* (2013.01); *G06F 2213/40* (2013.01)

(58) Field of Classification Search
CPC .............................. G06F 13/16; G06F 2213/40
See application file for complete search history.

(56) References Cited

U.S. PATENT DOCUMENTS 6,151,654 A * 11/2000 Poisner .................. G06F 13/28 710/240
8,027,293 B2 * 9/2011 Spaur .................. H04L 12/5692 370/335
9,270,274 B1 2/2016 Reese et al.
11,417,372 B2 * 8/2022 Murphy .............. G06F 9/30196
11,481,157 B2 * 10/2022 Suzuki .................. G06F 3/0659
11,860,669 B2 * 1/2024 Ke .......................... G06F 3/061
2008/0168214 A1 7/2008 Kwon et al.
(Continued)

FOREIGN PATENT DOCUMENTS

WO 2016112511 A1 7/2016

OTHER PUBLICATIONS

"Architecture of 8085 Microprocessor", Retrieved at: https://www.geeksforgeeks.org/architecture-of-8085-microprocessor/—on Jan. 2, 2025, Jan. 23, 2024, 20 pages.
(Continued)

*Primary Examiner* — Henry Tsai
*Assistant Examiner* — Christopher A Daley
(74) *Attorney, Agent, or Firm* — Colby Nipper PLLC

(57) ABSTRACT

This document describes technology for a runtime memory system that utilizes unpredictable multiplexing of memory bus lines. The technology dynamically reassigns data and/or address bus connections between a processor and its runtime memory during warm reset operations. The bus line assignments are made through a multiplexing mechanism—for example, data bus line 01 from the processor may be reassigned to link with bus line 23 at the runtime memory system interface. When a warm reset occurs, the physical mapping of memory locations changes due to this bus line reassignment. The system maintains standard memory operations while implementing this dynamic bus line configuration. Malicious software relying upon memory-resident exploit becomes inoperable after warm reset due to the changed physical memory topology created by the bus line reassignment process.

10 Claims, 6 Drawing Sheets

300

(56) References Cited

U.S. PATENT DOCUMENTS

| | | | | |
|---|---|---|---|---|
| 2015/0254192 | A1 | 9/2015 | Linstadt | |
| 2018/0136878 | A1* | 5/2018 | Madpur .................. | G11C 7/10 |
| 2019/0325142 | A1 | 10/2019 | Trikalinou et al. | |

OTHER PUBLICATIONS

"The Startup Sequence of a Computer", Retrieved at: https://www.futurelearn.com/info/courses/computer-systems/0/steps/53497#:~:text=So%2C%20how%20are%20these%20components,control%20to%20the%20operating%20system—on Jan. 2, 2025, 9 pages.
"MIPI SPMI—System Power Management", Retrieved at: https://www.mipi.org/specifications/system-power-management-interface—on Apr. 24, 2026, 8 pages.
"Extended European Search Report", EP Application No. 26152186.8, Jun. 11, 2026, 8 pages.
Sinha, et al., "Hardware-Interlocked Power Request Signaling for Secure Root-of-Trust Operations", Technical Disclosure Commons, https://www.tdcommons.org/dpubs_series/9924, Apr. 24, 2026, 11 pages.

* cited by examiner

300

RUNTIME MEMORY SYSTEM WITH UNPREDICTABLY ASSIGNED MULTIPLEXED MEMORY BUS LINES

CROSS-REFERENCE TO RELATED APPLICATION

This application claims the benefit of U.S. Provisional Patent Application Ser. No. 63/765,370 filed on Feb. 28, 2025, the disclosure of which is incorporated by reference herein in its entirety.

BACKGROUND

Warm reboots and cold reboots are two approaches to restart a computing device. Each approach has unique traits and vulnerabilities to consider. In a warm reboot, the power remains on during the restart process of a device's operation system or software programs. Unfortunately, there are potential security risks since the states in the device's runtime memory are maintained during a warm reboot. Retaining memory states in a warm reboot can allow cyber threats to exploit vulnerabilities, like cleared memory areas and manipulating the boot process with elevated privileges. The computing device is at risk when starting up the system as the Basic Input Output System (BIOS) and Unified Extensible Firmware Interface (UEFI) perform tasks with increased permissions that software could exploit to remain persistent on the system.

With a cold reboot, a computing device cuts off the power to all its parts. This resets everything in terms of hardware and memory. This approach is more secure because it clears out any exploits, in memory, unlike warm reboots that may leave some vulnerabilities. Cold reboots ensure that the system starts fresh with a cleared memory and reset hardware, making it less prone to security risks.

SUMMARY

This document describes technology for a runtime memory system that utilizes unpredictable multiplexing of memory bus lines. The technology dynamically reassigns data and/or address bus connections between a processor and its runtime memory during warm reset operations. The bus line assignments are made through a multiplexing mechanism—for example, data bus line 01 from the processor may be reassigned to link with bus line 23 at the runtime memory system interface. When a warm reset occurs, the physical mapping of memory locations changes due to this bus line reassignment. The system maintains standard memory operations while implementing this dynamic bus line configuration. Malicious software relying upon memory-resident exploit becomes inoperable after warm reset due to the changed physical memory topology created by the bus line reassignment process.

This document also describes computer-readable media having instructions for performing the above-summarized method and other methods set forth herein, as well as systems and means for performing these methods.

This summary is provided to introduce simplified concepts for a technology for runtime memory system that utilizes unpredictable multiplexing of memory bus lines, which is further described below in the Detailed Description and Drawings. This summary is not intended to identify essential features of the claimed subject matter, nor is it intended for use in determining the scope of the claimed subject matter.

BRIEF DESCRIPTION OF THE DRAWINGS

The details of one or more aspects of technology for a runtime memory system that utilizes unpredictable multiplexing of memory bus lines are described in this document with reference to the following drawings. The same numbers are used throughout the drawings to reference like features and components:

FIGS. 4-1 and 4-2 illustrate various examples of bus line assignments of a bus system in accordance with the technology described herein for the runtime memory system that utilizes unpredictable multiplexing of memory bus lines.

DETAILED DESCRIPTION

Overview

A technology is described herein for a runtime memory system that utilizes unpredictable multiplexing of memory bus lines. The technology dynamically reassigns bus lines between processors and runtime memory of an apparatus (e.g., computer device). The technology actively reconfigures data and/or address bus connections during warm reset operations. This remapping may be done in response to a warm reset of the apparatus. The bus-line remapping initiated in response to a warm reset circumvents exploitation attempts by memory-resident malicious software through dynamic reallocation of physical memory bus lines, thereby nullifying the efficacy of memory-persistent attack vectors targeting the runtime memory.

Operating Environment

Figure 1:
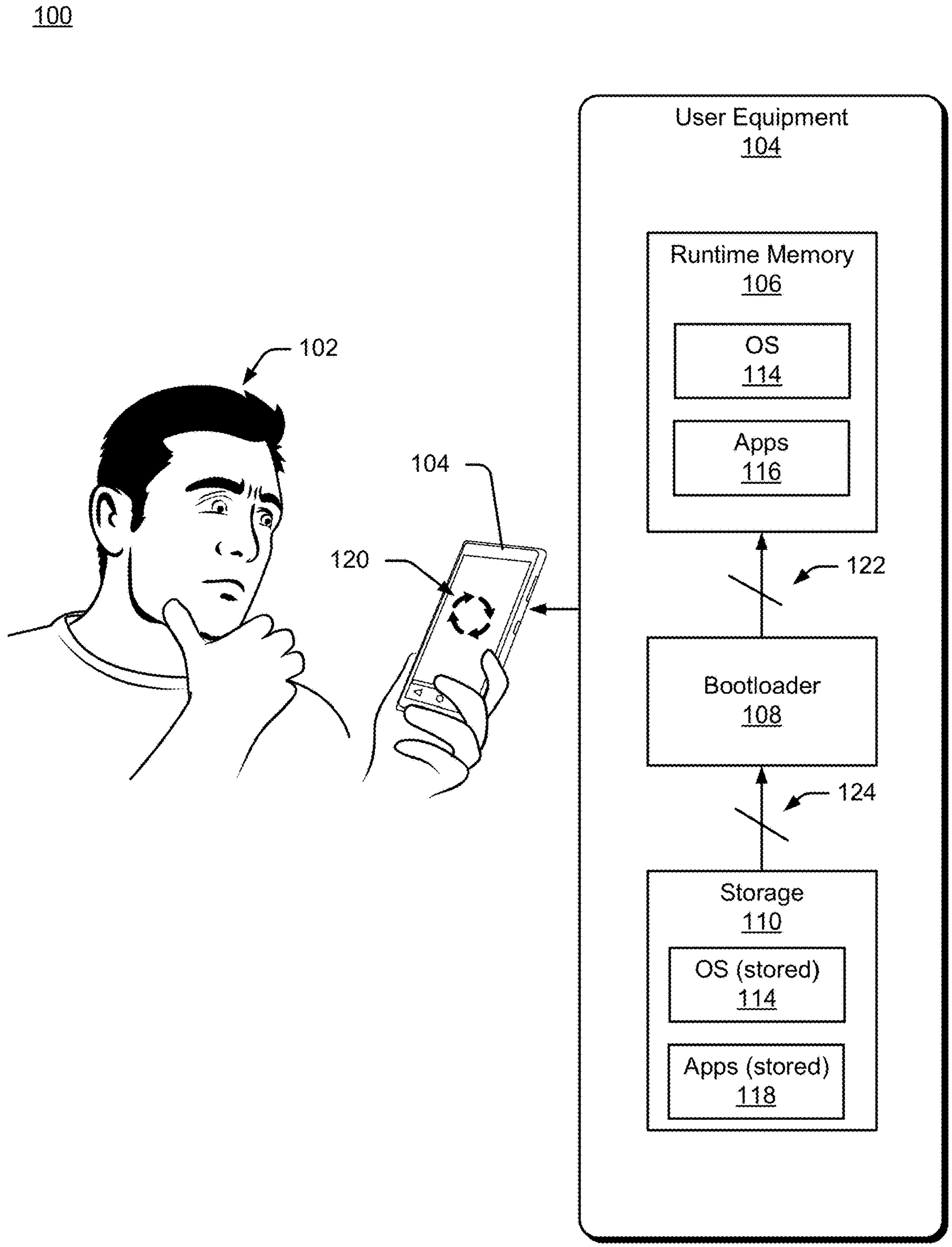
FIG. 1 illustrates an example operating environment in which techniques for a runtime memory system that utilizes unpredictable multiplexing of memory bus lines may be implemented.

FIG. 1 illustrates an example operating environment 100 in which techniques for a runtime memory system that utilizes unpredictable multiplexing of memory bus lines may be implemented. The example operating environment 100 includes a user 102 of a user equipment 104 (e.g., smartphone, mobile device, wearable, tablet, or computing device). The user equipment 104 includes a processor (not shown), a runtime memory system 106, a bootloader 108, and a storage system 110.

The runtime memory system 106 represents the active memory space that the operating system (OS) 112 and application programs (apps) 114 utilize during execution. During the reset (e.g., boot), the OS 112 is loaded into the runtime memory system 106 from the OS image 116 stored in the storage system 110. For apps 114 to execute, the software and data of the apps 118 are transferred from the storage system 110 into allocated memory regions of runtime memory system 106. Memory mapping mechanisms establish process isolation while enabling resource sharing. The OS 112 mediates memory operations and tracks allocations through mapping tables.

The storage system 110 is a persistent digital memory repository, retaining information for extended durations. The storage system 110 may utilize magnetic or electronic mechanisms to preserve data when power is disconnected. Common implementations include traditional hard disk drives, which employ rotating magnetic platters, and solid-state drives, which leverage electronic memory cells. Modern computing environments frequently integrate both local storage within devices and remote storage through networked systems.

The bootloader 108 constitutes the initial executable component in the user equipment 104. It enables the systematic transition from hardware power state to operating system (OS) execution. The initial execution occurs from a predefined memory address in non-volatile storage (e.g., storage system 110). The bootloader implements distinct operational phases in sequence. The first phase configures fundamental hardware components. This includes processor register initialization. This includes memory controller configuration. This includes basic input/output subsystem preparation.

The bootloader 108 then executes its primary operational function. It accesses non-volatile storage (e.g., storage system 110) containing the OS 112. It implements specific storage protocols to locate the kernel. It allocates designated memory regions in active system memory. It transfers kernel components through established data pathways. It verifies successful data transfer operations.

Final operations focus on preparing the execution environment. The bootloader 108 configures processor states, establishes memory management parameters, constructs system information structures, and executes a precise control transfer sequence. This sequence directs processor execution to the OS entry point. The OS then assumes control of system operations, completing the bootloader's functional sequence.

The user equipment 104—like a typical computing device—supports two reset (e.g., boot) methodologies: cold reset and warm reset. These distinct reset mechanisms serve different operational purposes and produce varying effects on system state preservation.

A cold reset (i.e., hard reset, power-on reset, cold boot, cold reboot) involves the removal of power from the user equipment 104. Users (e.g., user 102) typically initiate this action by disconnecting the power source or holding down the power button. During a cold reset, the user equipment 104 loses all of the contents of volatile memory (e.g., the runtime memory system 106). The hardware returns to its initial or default state. Cold resets often resolve persistent technical issues by clearing transient system states.

In contrast, a warm reset (i.e., soft reset, power-down reset, warm boot, warm reboot, reboot) maintains power to the user equipment 104. During a warm reset, the user equipment 104 preserves some of the contents of volatile memory (e.g., the runtime memory system 106). Key hardware components retain their operational states. Warm resets address minor system issues while maintaining certain system configurations.

The key distinctions between these reset types center on power state manipulation and data preservation. Cold resets completely clear the runtime memory system 106 and reset all hardware components. Warm resets maintain certain system states and configuration data. Cold resets take longer to complete but provide more thorough system clearing. Warm resets execute more quickly but offer limited system state clearing.

A warm reset is illustrated in FIG. 1. As indicated by a cross-out of arrows 122 and 124, during a warm reset, the bootloader 108 does not transfer the stored OS image 114 and the software and data of the apps 118 from the storage system 110 into allocated memory space in the runtime memory system 106. Rather, OS 114 and apps 116 remain properly allocated in the runtime memory system 106 after the warm reset.

The users (e.g., user 102) can intentionally trigger warm resets through software commands or brief hardware button presses. However, sometimes the user equipment 104 may automatically perform a warm reset because of specific technical conditions that compromise operational stability. Primary triggers for such conditions include kernel panic events, watchdog timer expirations, and critical system process failures. User equipment 104 may execute an automatic warm reset upon detecting unrecoverable runtime errors, memory corruption, or persistent resource deadlocks. Implementation-specific triggers may include sustained CPU utilization anomalies, memory management unit faults, and persistent I/O subsystem errors. Contemporary operating systems incorporate sophisticated error detection protocols that activate these system-initiated resets to maintain operational integrity.

As depicted in FIG. 1, user 102 is perplexed because user equipment 104 suddenly and for seemingly no apparent reason performs a warm reset, which is indicated by rotating circle 120. User 102 doesn't know why a warm reset is occurring, but unfortunately, memory-resident malicious software has purposely created a condition compromising operational stability to force the warm reset of user equipment 104.

Unbeknownst to user 102, the malicious software has positioned itself to execute immediately following the restoration of user equipment 104. Upon warm reset, the malicious software may access memory segments containing sensitive program data—such as OS 114 and apps 116, which remain properly allocated in the runtime memory system 106. These memory segments retain their contents due to the nature of a warm reset.

The malicious software can then analyze and extract information from the preserved memory regions. The malicious software often targets authentication credentials, encryption keys, and other security-critical data. The attack leverages the fundamental behavior of warm resets to bypass the memory-clearing procedures that occur in cold resets. System security mechanisms may fail to detect this exploitation due to the legitimate nature of the reset operation. The persistence of the malicious software across the reset enables continued system compromise.

Simplified Computer Architecture of an Example Apparatus

Figure 2:
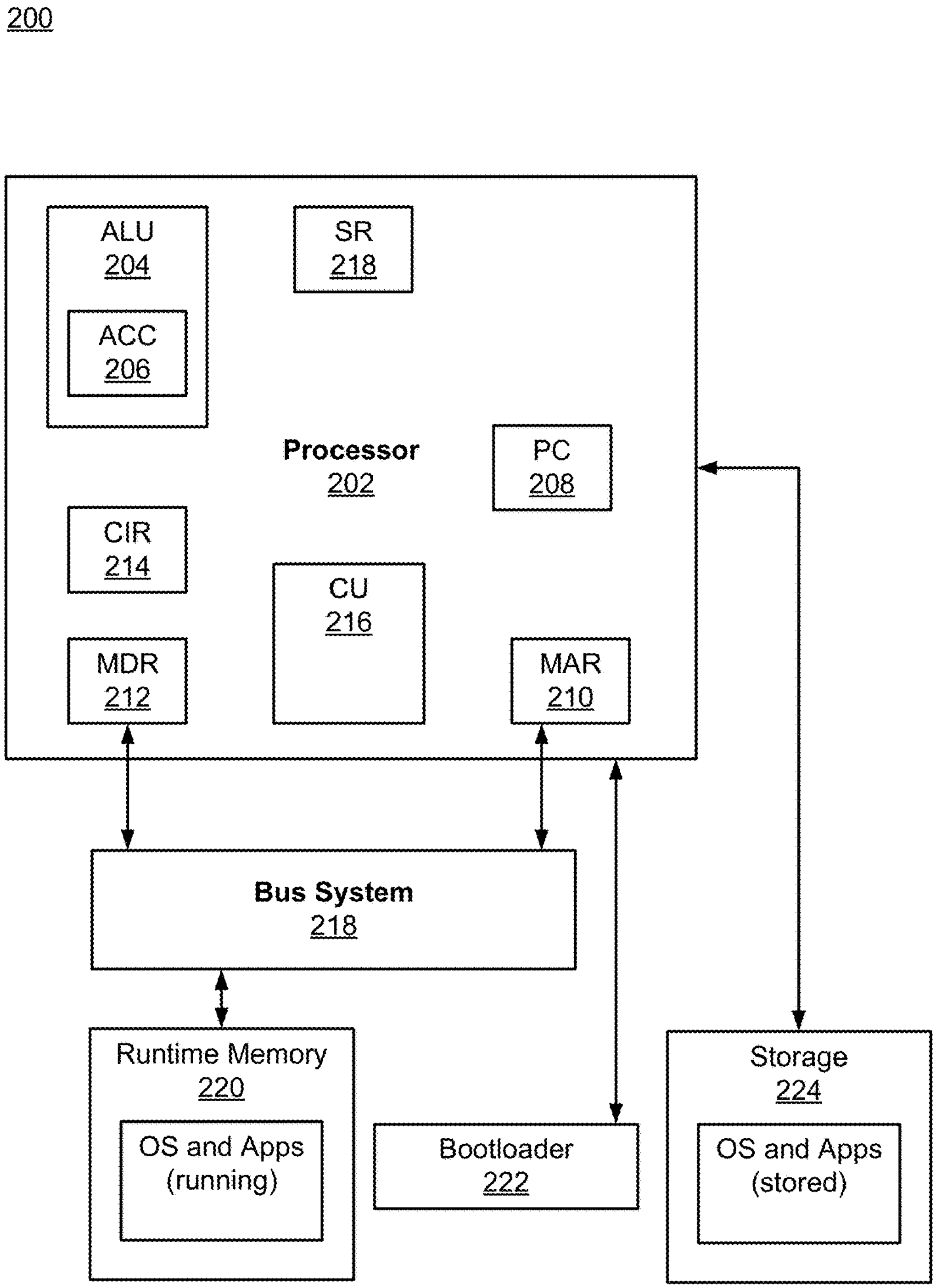
FIG. 2 illustrates an example apparatus in which techniques for a runtime memory system that utilizes unpredictable multiplexing of memory bus lines may be implemented.

FIG. 2 illustrates a simplified computer architecture of an example apparatus 200 in which techniques for the runtime memory system that utilizes unpredictable multiplexing of memory bus lines. The example apparatus 200 (such as user equipment 104) includes a processor 202, a memory bus system 218, a runtime memory system 220, a bootloader 222, and a storage system 224. The runtime memory system 220, bootloader 222, and storage system 224 of the apparatus 200 are much like the runtime memory system 106, bootloader 108, and storage system 110, respectively, of the user equipment 104 illustrated in FIG. 1 and in its accompanying description.

The runtime memory system 220 includes memory allocated to OS and application programs that are executing (e.g., running). The storage system 110 includes stored versions of the OS and application programs.

The processor 202 (e.g., central processing unit (CPU) or processors) functions as the primary computational engine of the apparatus 200. The processor 202 includes multiple integrated components that execute instructions through coordinated operations. As depicted, the processor 202 includes Arithmetic Logic Unit (ALU) 204, Program Counter (PC) 208, Memory Address Register (MAR) 210, Memory Data Register (MDR) 212, Current Instruction Register (CIR) 214, Control Unit (CU) 216, and Status Register (SR) 218.

The Arithmetic Logic Unit 204 executes mathematical calculations and Boolean operations through digital logic circuits. The Arithmetic Logic Unit processes binary data from input registers and transmits results to an Accumulator (ACC) 206 or designated destination registers. This component implements fundamental operations, including addition, subtraction, multiplication, division, AND, OR, and NOT operations. Accumulator 206 serves as a dedicated register for computational operations and stores intermediate results during arithmetic and logical sequences.

The Program Counter 208 stores the memory location of the next instruction and updates this address after each instruction cycle. The Memory Address Register 210 contains the active memory address for read or write operations and interfaces with the apparatus' memory management infrastructure. The Memory Data Register 212 functions as a temporary storage buffer for data movement between the processor 202 and the runtime memory 220, facilitating bidirectional data transfer across the bus system 218.

The Current Instruction Register 214 maintains the active instruction during execution and feeds this data to the Control Unit 216. The Control Unit 216 generates precise timing and control signals that orchestrate component operations throughout the processor 202. The Status Register 218 maintains condition codes and processor flags that reflect operational outcomes, including zero results, arithmetic carries, numeric overflows, and negative values. These flags influence program flow and conditional execution paths.

The instruction execution cycle progresses through distinct phases. The fetch phase retrieves instructions using addresses from the Program Counter 208 through the Memory Address Register 210. The decode phase interprets the instruction bits in the Current Instruction Register 214. The execute phase activates specific data paths and Arithmetic Logic Unit 204 operations. The store phase writes results to registers or memory. The Program Counter 208 advances to the next instruction address unless modified by branch or jump instructions. The Control Unit 216 coordinates these operations through precise control signals that regulate data movement and timing across all processor components. The Status Register 218 maintains execution status through flag bits that reflect computational outcomes and influence subsequent instruction flow.

Figure 3:
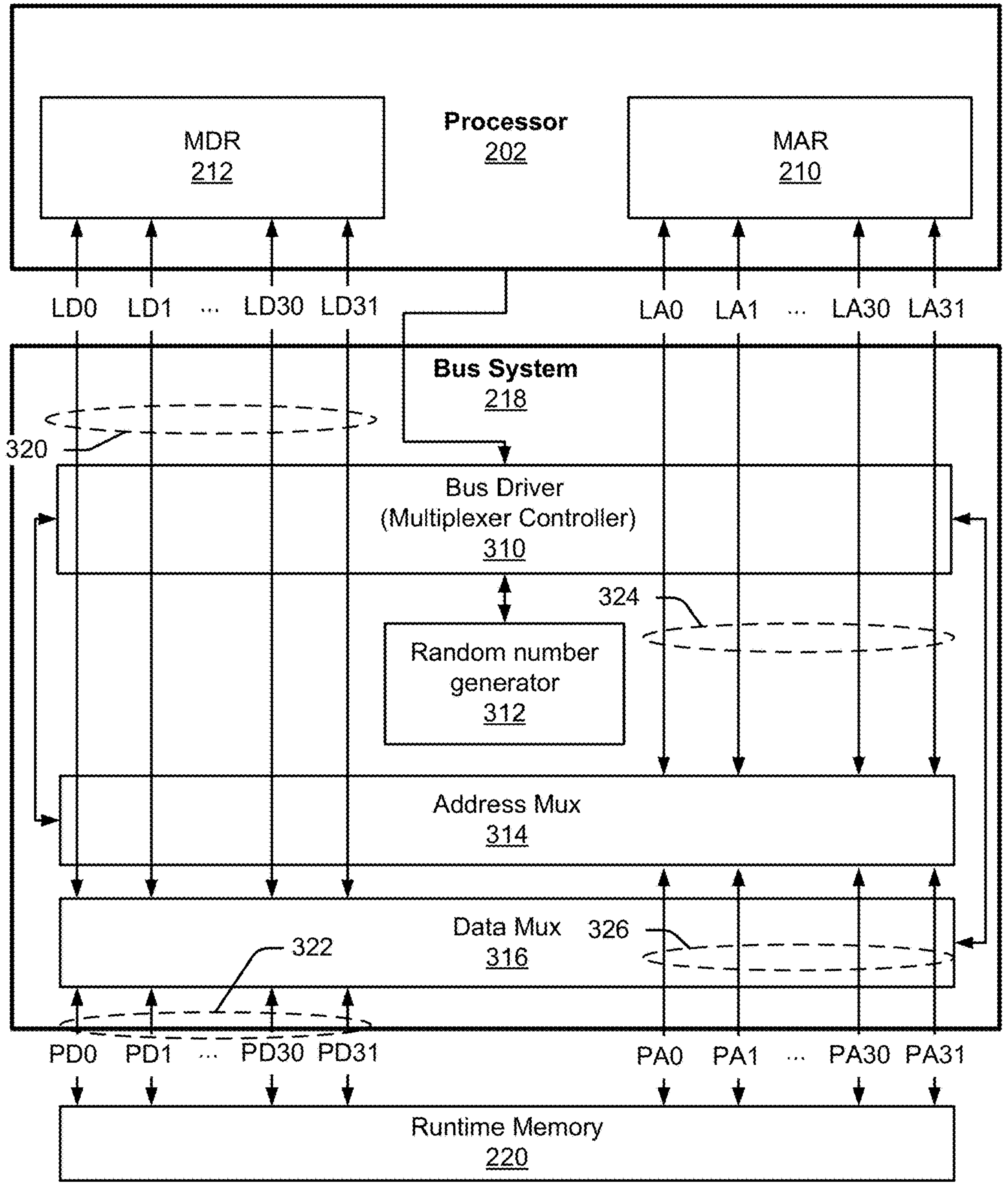
FIG. 3 illustrates an example bus system in accordance with the technology described herein for the runtime memory system that utilizes unpredictable multiplexing of memory bus lines.

The bus system 218 enables and manages data transfer between processor 202 and the runtime memory system 220 through dedicated communication pathways called buses. The details of the bus system 218 are shown in FIG. 3.

Typically, the processor-memory buses, such as that of the bus system 218, come in three types: data, address, and control. The data bus facilitates bidirectional data transmission between processor 202 and runtime memory system 220 through parallel signal lines. The address bus transmits memory location identifiers from processor 202 to the runtime memory system 220. The control bus carries synchronization signals (e.g., timing) that coordinate read and write operations of the runtime memory system 220.

The data bus width determines the amount of data transferred in each memory operation. For example, 64-bit data bus transfers eight bytes simultaneously, while a 32-bit bus handles four bytes per transfer. The address bus width establishes the addressable memory space capacity. For example, a 32-bit address bus can access 4 gigabytes of memory locations. The control bus implements specific signals, including read/write indicators, memory request lines, and timing synchronization pulses.

The bus system operates through precise timing protocols that govern signal transmission. For example, memory-read operations begin when processor 202 places an address on the address bus and activates the read control signal. The runtime memory system 220 responds by placing the requested data on the data bus. For example, memory-write operations commence when the processor drives both address and data buses while asserting the write control signal. The memory system captures the data and stores it at the specified address. Bus timing specifications define setup times, hold times, and signal transition requirements that ensure reliable data transfer operations.

Example Bus System

FIG. 3 illustrates a portion 300 of the apparatus 200 from FIG. 2. The portion 300 drills down on bus system 218 introduced in FIG. 2. Portion 300 is suitable for implementing the technology described herein for the runtime memory system that utilizes unpredictable multiplexing of memory bus lines.

As depicted, portion 300 includes some parts of processor 202, the bus system 218, and the runtime memory system 220. The parts of processor 202 shown are Memory Address Register 210 and Memory Data Register 212.

The bus system 218 includes a bus driver 310, a pseudo-random number generator 312, an address multiplexer ("mux") 314, a data multiplexer ("mux") 316, and various bus lines.

Pseudo-random number generator (e.g., RNG) 312 produces a sequence of numbers that appear to be random based on a pseudo-random number generation approach. Each sequence typically starts with a seed value controlling all subsequent outputs. In other implementations, the RNG 312 may be a hardware-based random number generator, which may produce true random numbers.

As implemented herein, the seed values may originate from various environmental and/or physical conditions. Such environmental and physical conditions may include ambient noise, system timing measurements (e.g., microseconds), device temperature, surrounding temperature, weather, network traffic, hard drive operations timings, measure of user interaction, system load variations, and the like. The seed may be a combination of several sources.

Regardless of the source of the seed, the use of pseudo-random numbers (or random numbers) lends to unpredictable results of the technology described herein. Knowledge of the number generation alone is insufficient to adequately predict the randomization of the results. Exact environmental and/or physical conditions are nearly impossible to replicate. Thus, a duplicate seed is nearly impossible to replicate. Therefore, based on the use of pseudo-random numbers (or random numbers), the technology described herein assigned multiplexed memory bus lines in an unpredictable manner.

A select few of processor-mux address bus lines 324 are shown connecting the Memory Address Register 210 of the processor 202 to the address mux 314. The select few processor-mux address bus lines 324 are labeled LA0, LA1, . . . , LA30, and LA31 for Logical Address bus line 0, Logical Address bus line 1, and so forth. The ellipse indicates twenty-eight missing lines therebetween. All told, there are thirty-two processor-mux address bus lines 324, which makes the width of a memory address thirty-two bits.

Another select few of mux-memory address bus lines 326 are shown connecting the address mux 314 to the runtime memory system 320. The select few mux-memory address bus lines 326 are labeled PA0, PA1, . . . , PA30, and PA31 for Physical Address bus line 0, Physical Address bus line 1, and so forth. The ellipse indicates twenty-eight missing lines therebetween. All told, there are thirty-two mux-memory address bus lines 326, which makes the width of a memory address thirty-two bits.

As depicted in FIG. 3, the processor-mux address bus lines 324 match the mux-memory address bus lines 326. There is no multiplexing applied. The processor-mux address bus lines 324 labeled LA0, LA1, . . . , LA30, and LA31 are linked to the mux-memory address bus lines 326 labeled PA0, PA1, . . . , PA30, and PA31, respectively.

Figures 1, 4:
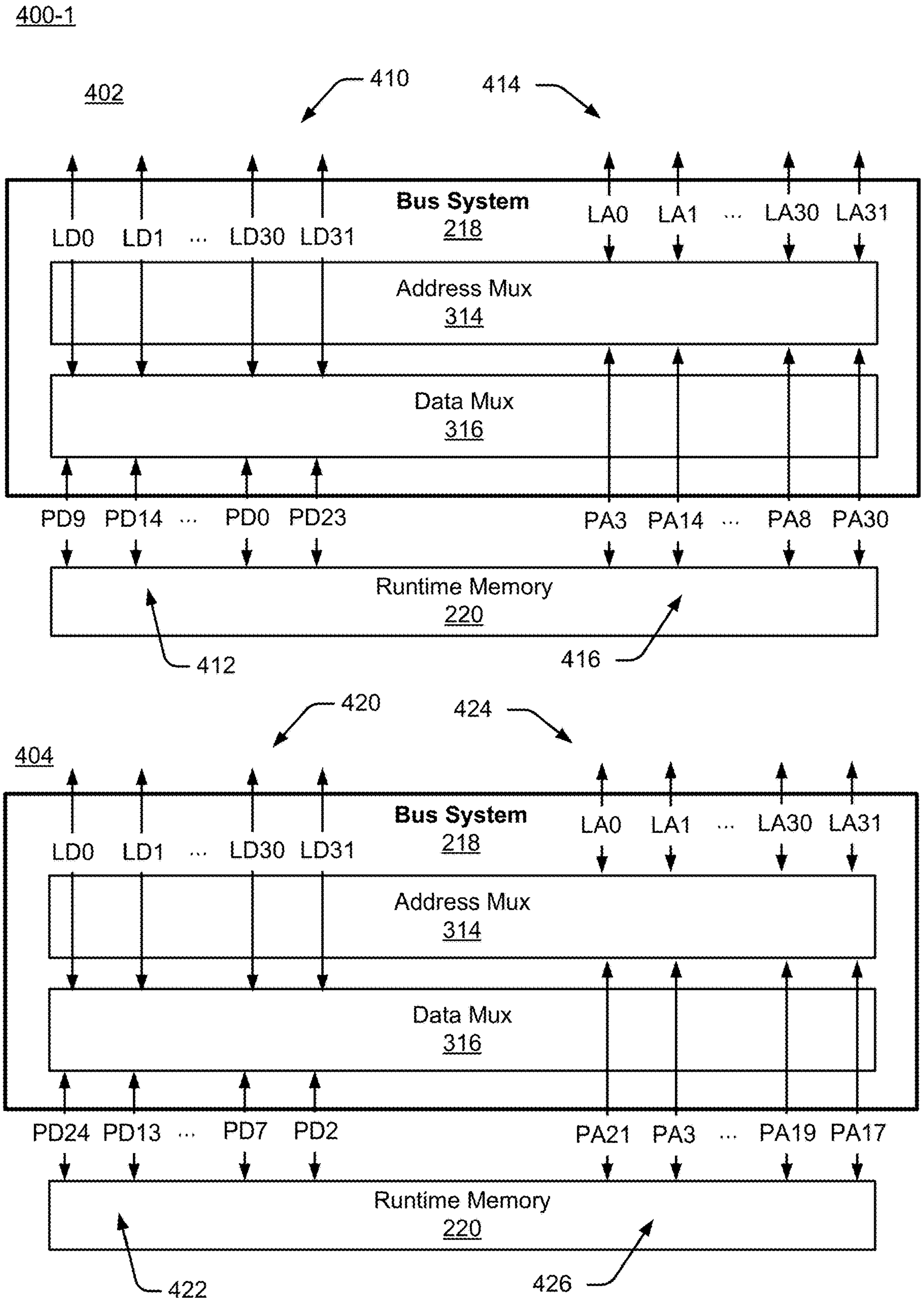
Figures 2, 4:
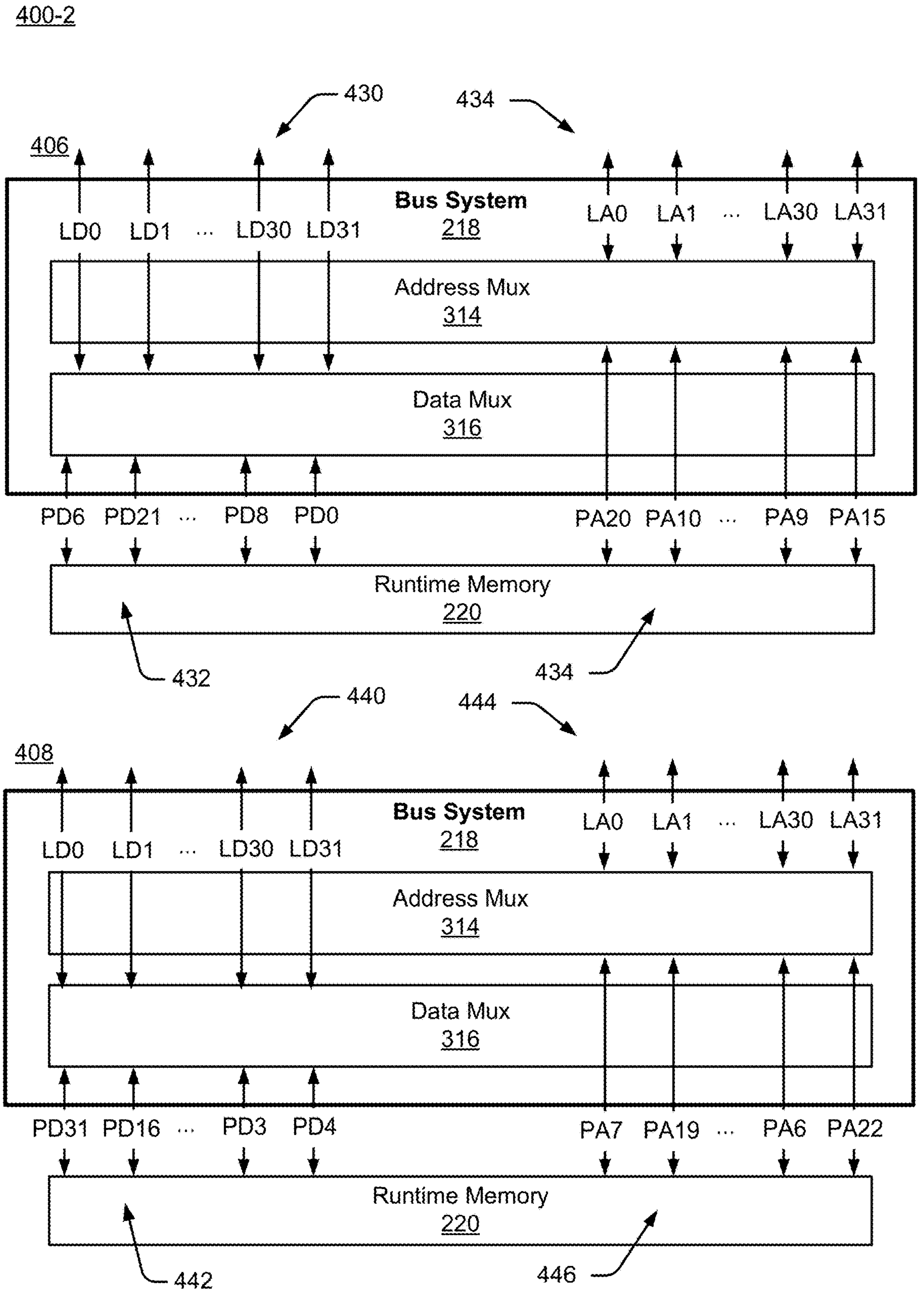

The address mux 314 is configured to selectively link each of multiple processor-mux address lines 324 to one of multiple mux-memory address lines 326. As shown in FIG. 3, the selective link is matching for all lines; thus, no multiplexing is applied. FIGS. 4-1 and 4-2 will provide examples of non-matching, multiplexed line assignments.

A select few of processor-mux data bus lines 320 are shown connecting the Memory Data Register 212 of the processor 202 to the data mux 316. The select few processor-mux data bus lines 320 are labeled LD0, LD1, . . . , LD30, and LD31 for Logical Data bus line 0, Logical Data bus line 1, and so forth. The ellipse indicates twenty-eight missing lines therebetween. All told, there are thirty-two processor-mux data bus lines 320, which makes the addressable data be 32 bits wide.

Another select few of mux-memory data bus lines 322 are shown connecting the data mux 316 to the runtime memory system 320. The select few mux-memory data bus lines 322 are labeled PD0, PD1, . . . , PD30, and PD31 for Physical Data bus line 0, Physical Data bus line 1, and so forth. The ellipse indicates twenty-eight missing lines therebetween. All told, there are thirty-two mux-memory data bus lines 322, which makes the addressable data be 32 bits wide.

As depicted in FIG. 3, the processor-mux data bus lines 320 match the mux-memory data bus lines 322. There is no multiplexing applied. The processor-mux data bus lines 320 labeled LD0, LD1, . . . , LD30, and LD31 are linked to the mux-memory data bus lines 322 labeled PD0, PD1, . . . , PD30, and PD31, respectively.

The data mux 316 is configured to selectively link each of multiple processor-mux data lines 320 to one of multiple mux-memory data lines 322. As shown in FIG. 3, the selective link is matching for all lines; thus, no multiplexing is applied. FIGS. 4-1 and 4-2 will provide examples of non-matching, multiplexed line assignments.

The bus driver 310 is a multiplexer ("mux") controller. Thus, the bus driver 310 manages and controls the multiplex function of the address mux 314 and the data mux 316. The bus driver 310 is configured to control the selective linkage of each of the multiple processor-mux lines to one of the multiple mux-memory lines. In one or more instances, the bus driver 310 is configured to control the selective linkage of each of the multiple processor-mux address lines 324 to one of the multiple mux-memory address lines 326. In other instances, the bus driver 310 is configured to control the selective linkage of each of the multiple processor-mux data lines 320 to one of the multiple mux-memory data lines 322. In other instances, the bus driver 310 is configured to control the selective linkage of each of the multiple processor-mux data lines 320 to one of the multiple mux-memory address lines 326 or vice versa.

The bus driver 218 may scramble the line assignments. In so doing, bus driver 218 obtains a pseudo-random number from the pseudo-random (e.g., random) number generator 312. Based on the obtained pseudo-random number, the bus driver 218 pseudo-randomly assigns the selective linkage of each of the multiple processor-mux lines to one of the multiple mux-memory lines.

In some instances, bus driver 218 may scramble the line assignments when triggered by, for example, receiving a command to scramble bus line assignments a bootloader (e.g., 108 or 222) of the apparatus 200. In some instances, bus driver 218 may scramble the line assignments when triggered by, for example, receiving an indication that a warm reset of apparatus 200 has been performed. In some instances, bus driver 218 may scramble the line assignments when triggered by, for example, receiving an indication that a cold reset of apparatus 200 has been performed.

Various Examples of Bus Line Assignments

FIGS. 4-1 and 4-2 illustrate various examples 400-1 of bus line assignments of a bus system in accordance with the technology described herein for the runtime memory system that utilizes unpredictable multiplexing of memory bus lines.

Example 402 of FIG. 4-1 includes bus system 218, address mux 314, data mux 316, runtime memory 220, and bus lines therebetween. As depicted, at the direction of the bus driver 218, the data mux 316 has selectively linked each of multiple processor-mux data lines 410 to one of multiple mux-memory data lines 412. Based on a pseudo-randomly generated number, the selective multiplex assignment of bus lines is effectively a scramble of such lines. An example of this is illustrated in example 402. Lines LD0, LD1, . . . , LD30, and LD31 of processor-mux data bus lines 410 are selectively assigned to lines PD9, PD14, . . . , PD0, and PD23, respectively, of the mux-memory data bus lines 412.

Similarly, at the direction of the bus driver 218, the address mux 314 has selectively linked each of multiple processor-mux address lines 414 to one of multiple mux-memory address lines 416. Based on a pseudo-randomly generated number, the lines may be scrambled, for example, lines LA0, LA1, . . . , LA30, and LA31 of processor-mux address bus lines 414 are selectively assigned to lines PA3, PA14, . . . , PA8, and PA30, respectively, of the mux-memory address bus lines 414.

Example 404 of FIG. 4-1 includes bus system 218, address mux 314, data mux 316, runtime memory 220, and bus lines therebetween. As depicted, at the direction of bus driver 218, the data mux 316 has selectively linked each of multiple processor-mux data lines 420 to one of multiple mux-memory data lines 422. Based on a pseudo-randomly generated number, the selective multiplex assignment of bus lines is effectively a scramble of such lines. An example of this is illustrated in example 404. Lines LD0, LD1, . . . , LD30, and LD31 of processor-mux data bus lines 420 are selectively assigned to lines PD24, PD13, . . . , PD7, and PD2, respectively, of the mux-memory data bus lines 422.

Similarly, at the direction of bus driver 218, the address mux 314 has selectively linked each of multiple processor-mux address lines 424 to one of the multiple mux-memory address lines 426. Based on a pseudo-randomly generated number, the lines may be scrambled, for example, lines LA0, LA1, . . . , LA30, and LA31 of processor-mux address bus lines 424 are selectively assigned to lines PA21, PA3, . . . , PA19, and PA17, respectively, of the mux-memory address bus lines 424.

Example 406 of FIG. 4-2 includes bus system 218, address mux 314, data mux 316, runtime memory 220, and bus lines therebetween. As depicted, at the direction of bus driver 218, the data mux 316 has selectively linked each of multiple processor-mux data lines 430 to one of multiple mux-memory data lines 432. Based on a pseudo-randomly generated number, the selective multiplex assignment of bus lines is effectively a scramble of such lines. An example of this is illustrated in example 406. Lines LD0, LD1, . . . , LD30, and LD31 of processor-mux data bus lines 430 are selectively assigned to lines PD6, PD21, . . . , PD8, and PD0, respectively, of the mux-memory data bus lines 432.

Similarly, at the direction of bus driver 218, the address mux 314 has selectively linked each of multiple processor-mux address lines 434 to one of multiple mux-memory address lines 436. Based on a pseudo-randomly generated number, the lines may be scrambled, for example, lines LA0, LA1, . . . , LA30, and LA31 of processor-mux address bus lines 434 are selectively assigned to lines PA20, PA10, . . . , PA9, and PA15, respectively, of the mux-memory address bus lines 434.

Example 408 of FIG. 4-2 includes bus system 218, address mux 314, data mux 316, runtime memory 220, and bus lines therebetween. As depicted, at the direction of bus driver 218, the data mux 316 has selectively linked each of multiple processor-mux data lines 440 to one of multiple mux-memory data lines 442. Based on a pseudo-randomly generated number, the selective multiplex assignment of bus lines is effectively a scramble of such lines. An example of this is illustrated in example 408. Lines LD0, LD1, . . . , LD30, and LD31 of processor-mux data bus lines 440 are selectively assigned to lines PD31, PD16, . . . , PD3, and PD4, respectively, of the mux-memory data bus lines 442.

Similarly, at the direction of bus driver 218, the address mux 314 has selectively linked each of multiple processor-mux address lines 444 to one of the multiple mux-memory address lines 446. Based on a pseudo-randomly generated number, the lines may be scrambled, for example, lines LA0, LA1, . . . , LA30, and LA31 of processor-mux address bus lines 444 are selectively assigned to lines PA7, PA19, . . . , PA6, and PA22, respectively, of the mux-memory address bus lines 446.

While not depicted, some implementations of the technology may involve cross assignments of lines so that processor-mux address lines are assigned to mux-memory data lines or vice versa.

Example Method

Figure 5:
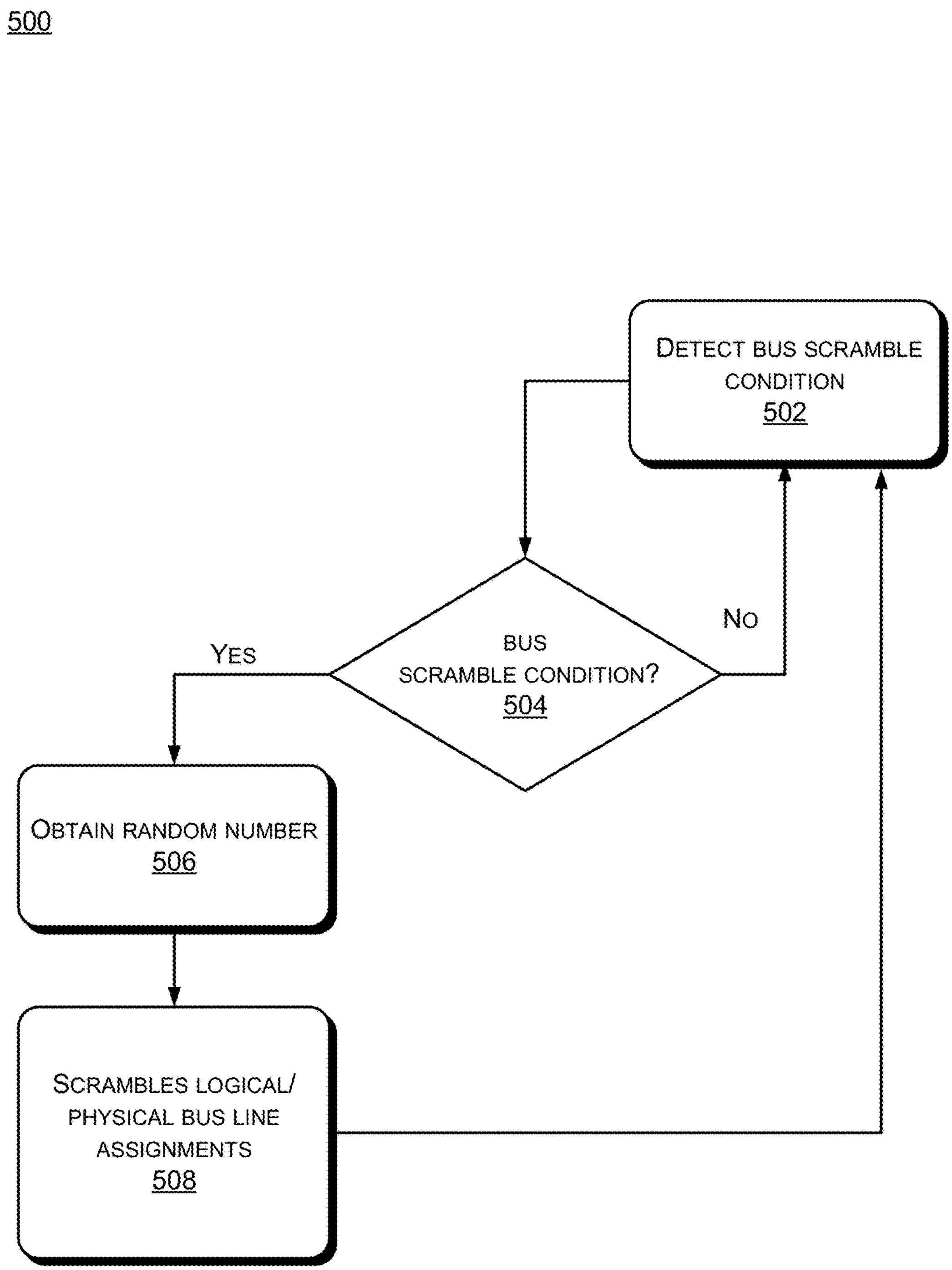
FIG. 5 illustrates an example method for unpredictable multiplexing of memory bus lines of a runtime memory in accordance with one or more implementations described herein.

FIG. 5 illustrates an example method 500 for unpredictable multiplexing of memory bus lines of a runtime memory in accordance with one or more implementations described herein. The example method 500 is performed by a suitable computing device, such as the apparatus 200.

At 502, the apparatus awaits a condition that would trigger a scramble of the linkage (e.g., multiplexed connection) of each of the multiple processor-mux lines to one of the multiple mux-memory lines. Examples of scramble conditions include a warm reset of the apparatus, a cold reset of the apparatus, receiving a scramble command from a bootloader (e.g., bootloader 222), or a combination thereof.

At 504, the apparatus determines whether a scramble-triggering condition has occurred. If not, the apparatus returns back to operation 502, waiting for such a condition. If so, then the method proceeds to 506 next.

At 506, the apparatus obtains a random number from a random number generator. For example, the bus driver 218 obtains a pseudo-random number from a pseudo-random number generator 312.

At 508, in response to the scramble-triggering condition and based on the obtained pseudo-random number, the apparatus scrambles the logical (e.g., processor-mux) bus lines and physical logical (e.g., mux-processor) bus line assignments. This may be described as the bus driver pseudo-randomly assigning the selective linkage of each of the multiple processor-mux lines to one of the multiple mux-memory lines. After that, the example method 500 returns to wait for another triggering condition.

CONCLUSION

Although implementations of techniques for, and apparatuses enabling, a runtime memory system that utilizes unpredictable multiplexing of memory bus lines have been described in language specific to features and/or methods, it is to be understood that the subject of the appended claims is not necessarily limited to the specific features or methods described. Rather, the specific features and methods are disclosed as example implementations enabling technology for a runtime memory system that utilizes unpredictable multiplexing of memory bus lines.

What is claimed is:

1. An apparatus comprising:

a processor;

a runtime memory system; and a bus system including:

one or more buses, each bus having multiple lines coupling the processor and the runtime memory system together, wherein the one or more busses are configured to facilitate reading and/or writing data from/to the runtime memory by the processor;

a mux configured to selectively link each of multiple processor-mux lines to one of multiple mux-memory lines; and a bus driver configured to control selective linkage of each of the multiple processor-mux lines to one of the multiple mux-memory lines.

2. The apparatus of claim 1, wherein one or more buses include an address bus and/or data bus.

3. The apparatus of claim 1, wherein the bus driver is configured to pseudo-randomly assign the selective linkage of each of the multiple processor-mux lines to one of the multiple mux-memory lines.

4. The apparatus of claim 1, wherein, upon a warm reset of the apparatus, the bus driver is configured to reassign the selective linkage of each of the multiple processor-mux lines to one of the multiple mux-memory lines.

5. The apparatus of claim 1, wherein, upon a cold reset of the apparatus, the bus driver is configured to assign the selective linkage of each of the multiple processor-mux lines to matching one of the multiple mux-memory lines.

6. The apparatus of claim 1, wherein the bus driver is configured to perform operations comprising:

obtaining a pseudo-random number from a random number generator of the apparatus; and based on the obtained pseudo-random number, pseudo-randomly assigns the selective linkage of each of the multiple processor-mux lines to one of the multiple mux-memory lines.

7. The apparatus of claim 1, wherein the bus driver is configured to perform operations comprising:
- receiving a command to scramble bus line assignments from a bootloader of the apparatus;
- obtaining a pseudo-random number from a random number generator of the apparatus; and
- in response to the received command and based on the obtained pseudo-random number, pseudo-randomly assigns the selective linkage of each of the multiple processor-mux lines to one of the multiple mux-memory lines.

8. The apparatus of claim 1, wherein the bus driver is configured to perform operations comprising:
- receiving a warm reset indication;
- obtaining a pseudo-random number from a random number generator of the apparatus; and
- in response to the warm reset and based on the obtained pseudo-random number, pseudo-randomly assigns the selective linkage of each of the multiple processor-mux lines to one of the multiple mux-memory lines.

9. The apparatus of claim 1, wherein the bus driver is configured to perform operations comprising:
- receiving either a warm or cold reset indication;
- obtaining a pseudo-random number from a random number generator of the apparatus; and
- in response to the warm reset and based on the obtained pseudo-random number, pseudo-randomly assigns the selective linkage of each of the multiple processor-mux lines to one of the multiple mux-memory lines.

10. The apparatus of claim 1, wherein a bootloader of the apparatus is configured to issue a command to the bus driver to scramble bus line assignments after a warm reset.

* * * * *